(12) United States Patent
Perju et al.

(10) Patent No.: US 9,233,760 B2
(45) Date of Patent: Jan. 12, 2016

(54) ANGLE MEASUREMENT PROBE ON BOARD AN AIRCRAFT AND AIRCRAFT IMPLEMENTING AT LEAST ONE SUCH PROBE

(71) Applicants: AIRBUS OPERATIONS (S.A.S.), Toulouse (FR); AIRBUS (S.A.S.), Blagnac (FR)

(72) Inventors: Catalin Perju, Saint Loup Cammas (FR); Laurent Delessard, Castelnau de Montmiral (FR); Jerome Robillard, Seilh (FR)

(73) Assignees: Airbus Operations (S.A.S.), Toulouse (FR); Airbus (S.A.S.), Blagnac (FR)

( * ) Notice: Subject to any disclaimer, the term of this patent is extended or adjusted under 35 U.S.C. 154(b) by 0 days.

(21) Appl. No.: 14/184,081

(22) Filed: Feb. 19, 2014

(65) Prior Publication Data

US 2014/0230539 A1      Aug. 21, 2014

(30) Foreign Application Priority Data

Feb. 20, 2013   (FR) .................................... 13 51437

(51) Int. Cl.
| | | |
|---|---|---|
| B64D 43/02 | (2006.01) | |
| G01P 13/02 | (2006.01) | |
| G01D 5/347 | (2006.01) | |
| G01D 5/34 | (2006.01) | |

(52) U.S. Cl.
CPC .............. B64D 43/02 (2013.01); G01D 5/342 (2013.01); G01D 5/3473 (2013.01); G01P 13/025 (2013.01)

(58) Field of Classification Search
CPC ...................................................... B64D 43/02

USPC ........................................................... 73/180
See application file for complete search history.

(56) References Cited

U.S. PATENT DOCUMENTS

| 4,224,514 A | 9/1980 | Weber |
| 5,083,279 A | 1/1992 | Burdoin |
| 2002/0169525 A1* | 11/2002 | Cronin et al. ..................... 701/6 |
| 2006/0284061 A1* | 12/2006 | Yeoh et al. ............... 250/231.13 |
| 2009/0099811 A1 | 4/2009 | Spoerry et al. |

(Continued)

FOREIGN PATENT DOCUMENTS

| FR | 2 791 773 A1 | 10/2000 |
| FR | 2 922 301 A1 | 4/2009 |
| WO | WO 01/67115 A2 | 9/2001 |

(Continued)

OTHER PUBLICATIONS

French Search Report for Application No. FR 1351437 dated Oct. 25, 2013.
European Seach Report for Application No. 14 155 519.3 dated Apr. 4, 2014.

*Primary Examiner* — Lisa Caputo
*Assistant Examiner* — Jamel Williams
(74) *Attorney, Agent, or Firm* — Jenkins, Wilson, Taylor & Hunt, P.A.

(57) ABSTRACT

The invention relates to an angle measurement probe on board an aircraft, which comprises a fin, which can move in rotation about an axis, at least one first optical encoder and one second optical encoder, each comprising at least one disk, each disk being fixed at right angles to the central axis and being provided with at least two circular tracks, each track being provided with alternate opaque and transparent zones, means for processing the output signal from each encoder.

15 Claims, 6 Drawing Sheets

(56) References Cited

U.S. PATENT DOCUMENTS

2013/0321197 A1* 12/2013 Klingler et al. ............... 342/174
2014/0057770 A1* 2/2014 Holmes et al. .................. 494/10

FOREIGN PATENT DOCUMENTS

WO    WO 2008/018059 A2    2/2008
WO    WO 2008018059 A2 *    2/2008  ............. G01D 5/347

* cited by examiner

ANGLE MEASUREMENT PROBE ON BOARD AN AIRCRAFT AND AIRCRAFT IMPLEMENTING AT LEAST ONE SUCH PROBE

TECHNICAL FIELD

The invention relates to an angle measurement probe on board an aircraft, for example for measuring the angle of attack or the side slip angle, and an aircraft implementing at least one such probe.

Hereinbelow, an aircraft of aeroplane type will be considered by way of example.

BACKGROUND

The data systems on board an aircraft, such as an aeroplane, comprise aerodynamic and thermodynamic sensors and their associated electronics which measure the characteristics of the air stream surrounding the aeroplane and convert this information into electrical signals. These sensors comprise transducers, rotating electrical machines, or, more generally, resolvers, or pressure difference devices, the signals of which are processed to obtain flight parameters such as the angle of attack and the side slip angle.

These sensors are situated at specific points of the cockpit of the aeroplane. They are in particular temperature sensors, rotating fins or multifunction devices incorporating probes of tube type ("tube-slot") with self-alignment capabilities.

Such instrumentation exhibits drawbacks such as a sensitivity to electromagnetic threats, heavy weight, a relatively large volume, a need for several power supply voltages, etc. Furthermore, the high accuracy of certain sensors can lead to high costs, and condition the technology to be employed and the positioning of these sensors.

In the aeroplanes, the data originating from the onboard sensors make it possible to provide information to the pilot. Some of these data relate to particular measurements, which are those of the angle of attack and the side slip angle. Currently, these measurements are performed using specific rotating electrical machines.

The angle of attack is an angle measured in the normally vertical plane X-Z of symmetry of an aeroplane. More specifically, this angle is measured relative to a reference line, which is a line linking the leading edge and the trailing edge at median points on a wing. Most commercial aeroplanes use the central line or the longitudinal axis of the fuselage as reference line. The angle of attack is defined as the angle at which the relative wind encounters the reference line of the wing or of the fuselage.

The side slip angle is the angle between a vector, called aeroplane speed vector, and the longitudinal axis thereof.

To measure the angle of attack and the side slip angle of an aeroplane, there are in particular known:
 a measurement method based on probes using fins that can move in rotation,
 a measurement method based on probes using pitot tubes and/or holed surfaces and/or tubes.

A probe 16 using a fin that can move in rotation is represented in FIGS. 1A to 1C and 2. With such a probe, it is possible to measure the angle of attack as follows. A fin 10 is oriented in the direction of the local air stream, parallel to the relative wind of the apparatus. Electronic means make it possible to determine the angle between the local air stream and a reference axis of the aeroplane, in order to then estimate, by difference, the angle of attack. The fin is mounted to move in rotation on a central axis 14 of a cylindrical housing 11. The latter is closed at both of its ends, and is also provided, on the one hand, with a connector 13 and, on the other hand, with a plate 12 pierced with a central circular orifice which is passed through by the axis 14.

A measurement method based on the use of this type of device is commonly used to measure the angle of attack and the side slip angle. The measurement of these angles makes it possible to know if the aeroplane is within the flight envelope limits specified by the aeroplane manufacturer.

Figure 1A:
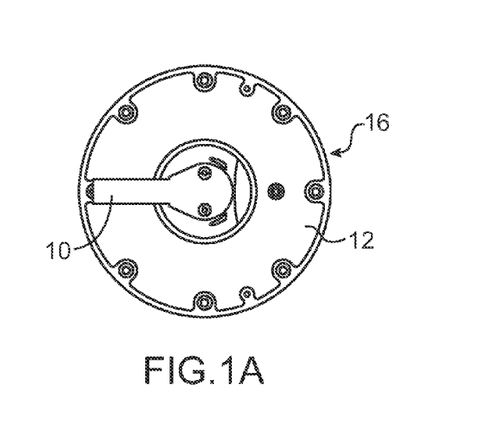
FIGS. 1A to 1C and 2 illustrate an angle measurement probe of the known art respectively in a plan view, in two side views and in a longitudinal cross section.
Figure 1B:
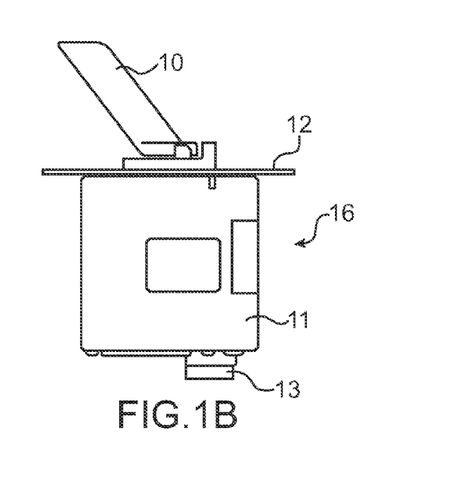
Figure 1C:
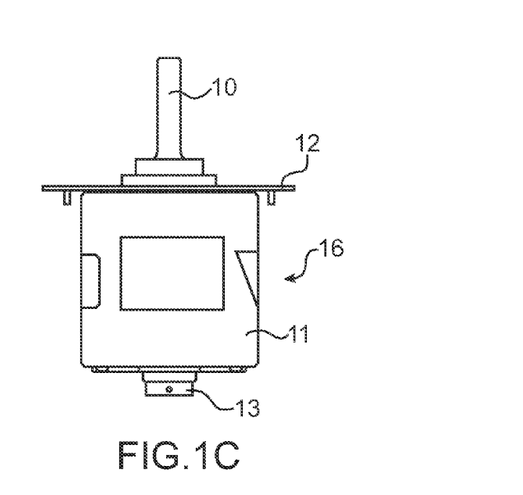
Figure 2:
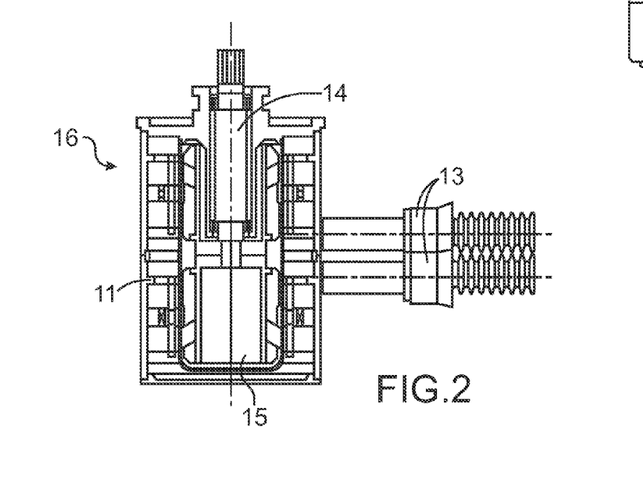

The fin 10 illustrated in FIGS. 1A to 1C can revolve freely by a given angle, so as to be positioned in a local air flow in line with the probe and parallel thereto.

The rotation of the fin is transmitted to the axis 14, on which it is mounted, and which is in turn coupled to a rotary position transducer 15 with brushless resolver. The electrical signal generated by the latter can then be processed by a processing circuit and be converted into a digital signal, which can be transmitted to the onboard computer via a data bus.

Such a probe with rotating fin from the known art can also use an actively controlled slot heating technology, in order to de-ice the fin in all icing conditions.

Figure 3:
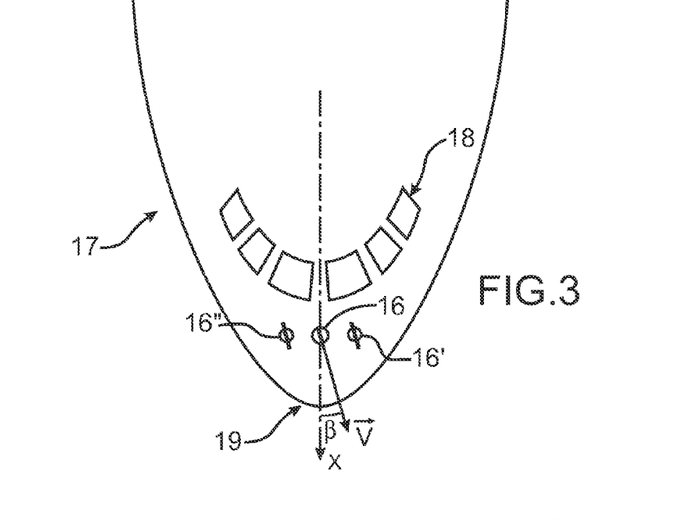
FIG. 3 illustrates the front part of an aeroplane incorporating such a probe from the known art.

The document FR 2922301 (or US 2009 099811) describes the use of such a probe which, as illustrated in FIG. 3, is positioned on the surface of the fuselage of an aeroplane 17, in the front part thereof, precisely in the region situated in front of the cockpit 18 (the term "front" being understood in the conventional manner, that is to say towards the nose 19 of the aeroplane, in the direction X). The measured side slip angle β is thus the angle formed locally between the orientation of the speed vector of the flow of the air in line with the probe $\vec{V}$ and the direction X projected in a horizontal plane. Other side slip probes can be provided on the surface of the fuselage of the aeroplane, such as, for example, probes 16', 16".

Such a probe with rotating fin from the known art presents the following drawbacks:
 its volume is large and can lead to integration difficulties because of the reduced space available,
 its weight is heavy: approximately 1925 kg per probe.

SUMMARY

The subject of the invention is an angle measurement probe on board an aircraft, for example an aeroplane, that makes it possible to provide a digital signal whose value is a function of a side slip angle or of an angle of attack of this aircraft while attempting to mitigate the various drawbacks defined above.

The invention also aims to propose a novel type of probe with rotating fin, which makes it possible to solve one or more of the above-mentioned problems.

According to one of its aspects, the invention relates to an angle measurement probe on board an aircraft, for example for measuring an angle of attack or a side slip angle, which comprises:
 a fin, which can move in rotation about an axis,
 at least one first optical encoder and one second optical encoder, each comprising at least one disk, each disk being fixed at right angles to the central axis and being provided with at least two circular tracks, each track being provided with alternate opaque zones and transparent slots (two adjacent slots—or any two adjacent slots—of one track being possibly regularly spaced from each other and/or separated by an opaque zone),
 means for processing the output signal from each encoder.

The probe can comprise a housing which contains the optical encoder(s) and the means for processing the output signal from each encoder.

Preferentially, the housing and each encoder are seal-tight.

In a particular embodiment, the probe also comprises optical transmission means for transmitting angle data generated by the means for processing the output signal from each encoder.

Preferentially, the probe also comprises:
at least one temperature sensor sensing the temperature of the fin,
means for heating the fin on the basis of data measured by said temperature sensor sensing the temperature of the fin.

Damping means for each disk can also be provided.

Each optical encoder can comprise two disks, each track of each disk being associated with an opto-electrical barrier which generates a signal, one of which is called direct signal and the other of which is called complementary signal.

In such a probe, the two disks of one and the same encoder are preferentially offset by 90°, in order to be able to check the robustness of the installation and the quality of the information.

In such a probe, the two tracks of one and the same disk can be offset in order to generate an offset of 90° between the period of the signal from one of the two tracks and the period of the signal from the other track.

Preferentially, the signal processing means determine the direction of rotation of the fin and its angle of rotation as a function of at least two signals, each of these two signals being associated with a track of one of the disks.

A check on the data can be performed, in which:
a) if all the data computed for the different optical encoders are identical, the data generated for one of them are selected;
b) if the data generated for one of the encoders are different from those generated for the other encoder or encoders, a check is performed over several measurement cycles for confirmation, and the data which are different from those obtained for all the other encoders are eliminated.

A probe according to the invention preferentially comprises first processing means, which receive and process the output signals from the first encoder, but not from the second encoder, and second processing means, which receive and process the output signals from the second encoder, but not from the first encoder.

In a particular embodiment, the processing means store a plurality of results relating to the direction and the angle of rotation, for:
performing at least one comparison between the data;
and/or checking the consistency of the measured data;
and/or eliminating anomalies;
and/or retransmitting data lost in a transmission of said data;
and/or ensuring a transition between a double-accuracy measurement mode and a single-accuracy measurement mode.

According to one embodiment, each disk comprises at least two concentric tracks, each comprising successive slots, aligned in a circle centred on the centre of the disk, the slots of each track being offset relative to the slots of each other track.

Preferentially, the two barriers of one and the same disk are offset by 180°.

An aircraft can comprise at least one probe as described hereinabove, it can also comprise a plurality, for example two or three, of these probes. The probe according to the invention offers numerous advantages:

it makes it possible to detect a physical phenomenon (air stream) by using a method that is different and advantageous compared to the methods implemented in the prior art,
it makes it possible to implement and use advantageously a plurality of technologies,
it allows for operation in single-accuracy or double-accuracy mode (double encoder, double channel with redundant architecture),
it does not require a very fine alignment, unlike the known solutions: it is sufficient for the axis to transmit a rotation movement, the only alignment being that of the axial reference of the encoder with the axis of the fin.

DETAILED DESCRIPTION

Figures 4A, 4B:
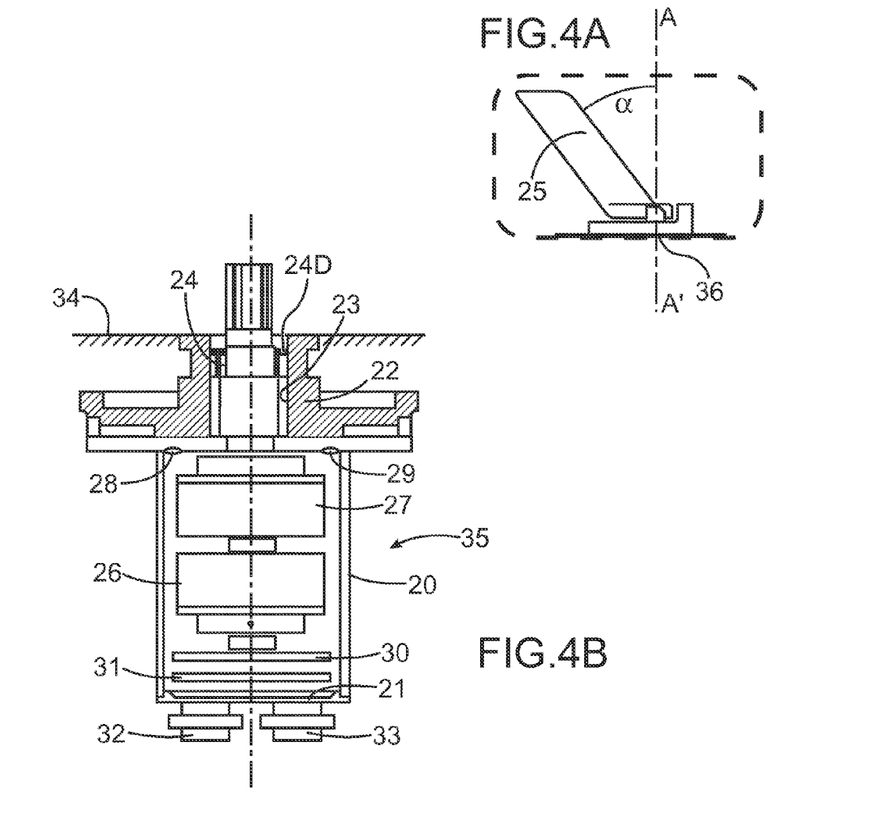
FIGS. 4A-4C illustrate aspects of an angle measurement probe according to the invention.
Figure 4C:
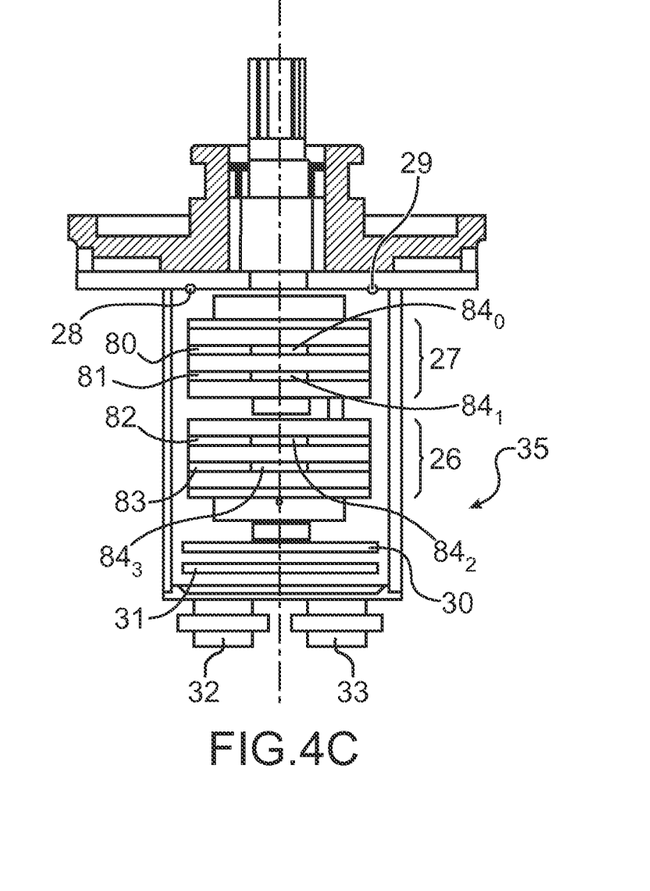

An example of an angle measurement probe 35 according to the invention is illustrated in FIGS. 4A, 4B and 4C.

In this example, the probe comprises a fin 25, mounted to move in rotation on a central axis 24 (of direction AA' in FIG. 4A) of a housing 20 (represented in FIGS. 4B and 4C), which is preferably cylindrical. The angle α designates the angle of deflection of the fin, between the leading edge of the fin and the axis 24. The value of this angle is chosen in such a way as to ensure the best trade-off between a minimum stray drag and a maximum sensitivity to low side slips. The axis 24 can also move in rotation. It is passive, in as much as it has no function from the electrical point of view (there is neither winding nor power supply about this axis), unlike the known probes.

The housing 20 is preferably made of a low-contaminant, high-quality thermoplastic material resistant to severe environmental conditions.

The housing 20 comprises two ends, one situated on the side of the fin 25, and the other situated on the opposite side thereof. The housing is closed at both of its ends:
on the fin side, by a cover 22, which is pierced with an orifice 23, preferably circular and arranged in the middle or at the centre of the cover. This orifice allows for the passage of the axis 24, about which a seal 240 can be arranged;
on the side opposite the fin, by a bottom 21, on the outer surface of which is fixed at least one, or more, connectors, here two connectors 32 and 33.

The fin is not mounted directly on the cover 22, but on a plate 36, called mechanical plate or baseplate, which is in turn fixed to the cover 22. The plate 36 is passed through by the axis 24. The mounting of the fin on its baseplate 36 is represented in FIG. 4A.

In the housing 20, there is arranged at least one optical encoder, for example of the type with multiple disks and multiple barriers.

To this end, mechanical interfaces are provided for fixing the encoder, or encoders, inside the probe. These interfaces enable the encoder, or encoders, to be mounted and removed using screws, accessible from the outside of the probe.

In the example illustrated, the housing 20 contains a first and a second optical encoders 26 and 27, mounted on the axis 24. Each encoder comprises at least one disk, advantageously two disks. Each disk comprises at least one circular track provided with opaque and transparent zones, defining alternate slots, for example 2048 of them, any two neighbouring slots being preferably regularly spaced from each other or being separated by a constant distance. A disk structure will be explained in more detail below, notably in conjunction with FIG. 6A. The disks are preferentially mounted on damping springs or on elements made of an elastic material, which enables them to operate without problems in the event of impacts, vibrations, turbulences, etc.

The set of two disks is mounted securely, on a lubricated and ingress-protected rolling bearing (recommended for protection index IP 66). The internal diameter of the rolling bearing allows it to be mounted on the axis 24. Means, for example for a screw fastening, can be provided, on the axis 24 and at the ends of the axis of the rolling bearing, in order to ensure that the axis 24 does not slip inside the rolling bearing of the encoder.

The encoders are mounted on the axis 24, in such a way that the alignment and the reduction of the radial loads are minimal. To this end, the axis 24 can include mounting and alignment references.

The first and the second encoders can be offset by 90° in order to detect a failure on one or other of the encoders.

Optionally, the two encoders are mounted at an angle of 45° relative to the axis 24, in such a way as to reduce the effects of a common detection error, due to a single event (for example due to an impact in a determined direction).

The axis 24 can be fixed by two so-called "load" rolling bearings in such a way that the rolling bearings of the encoders are relieved of any undesirable mechanical effort.

An advantage of this structure is the reduction of the length of the axis and of the mechanical loads. Compared to the known probes, a reduction of the length of the axis of as much as 40% can be observed.

Each optical encoder is provided with at least two wired outputs (one for each barrier), with a twisted and shielded conductor cable, so as to ensure a good quality transmission of the signals to the signal processing boards.

Each optical encoder is advantageously protected in a hermetically-sealed housing (each of the references 26, 27 of FIG. 4B designates both an optical encoder and its housing) to avoid any ingress of contaminant. The axis 24 passes through each housing through an opening formed in the latter and a seal, for example an O-ring seal, can be provided at the periphery of this opening.

The probe assembly is assembled in such a way as to offer adequate seal-tightness to water and to fine particles which could otherwise penetrate into each of the housings 20, 26, 27. The seals, arranged at the input of the device (in the orifice 23) and in the openings of the housings allowing the axis 24 to pass through, contribute to this seal-tightness.

A probe according to the invention can therefore be doubly seal-tight: in the probe housing and at the individual level of the housing of each optical encoder. This allows for:

operation in a degraded context, for example after the impact of a bird on the cockpit of the aeroplane, the maintenance of one of the optical encoders without intervention on another of these encoders.

In FIG. 4C, the encoders are represented without their respective housing.

This figure therefore shows in more detail the construction of each optical encoder 26, 27, each of them comprising two slotted disks 80, 81 (for the encoder 27) and 82, 83 (for the encoder 26). Each disk is fixed to the central axis 24, at right angles thereto.

More specifically, each disk is mounted on a dedicated bearing $84_0$, $84_1$, $84_2$, $84_3$, itself also mounted on the axis 24, and its centre is aligned on the axis 24. In this FIG. 4C, references identical to those of FIGS. 4A and 4B designate the same elements.

Each set of two disks can have a geometrical form enabling it to ensure the rigidity and the resistance to significant load factors on the axis Z.

As represented in FIGS. 4B and 4C, the housing 20 can contain at least one processing board, advantageously two processing boards 30 and 31, for the processing of the output signals from the optical encoder or encoders. Exemplary embodiments of such a board are given later, in conjunction with FIGS. 5A and 5B.

The probe can also be provided with at least one temperature sensor, here two temperature sensors 28 and 29 arranged in the housing 20. Preferably, the latter are incorporated in such a way as to produce a measurement of the temperature of the fin 25 and of its baseplate 36, which is as reliable as possible. Typically, each of them has an impedance that varies with temperature. Each sensor can be produced from a thermistor, but other devices can also be used. Advantageously, heating means for the fin 25 and its baseplate 36 can also be provided, as well as a circuit or means for regulating these heating means, on the basis of the data from the temperature sensors 28, 29. Such means and their operation are described later in this text.

Moreover, at least one temperature sensor (for example a thermo-resistor or a thermopile IR) can be provided to give information on the temperature T inside the probe. The information concerning the temperature T allows for a correlation between frequent detection errors and an abnormal temperature inside the probe. Heating means make it possible to compensate for errors which devolve from the occurrence of thermo-electrical phenomena to which the optical encoders or barriers can be sensitive.

Figure 5A:
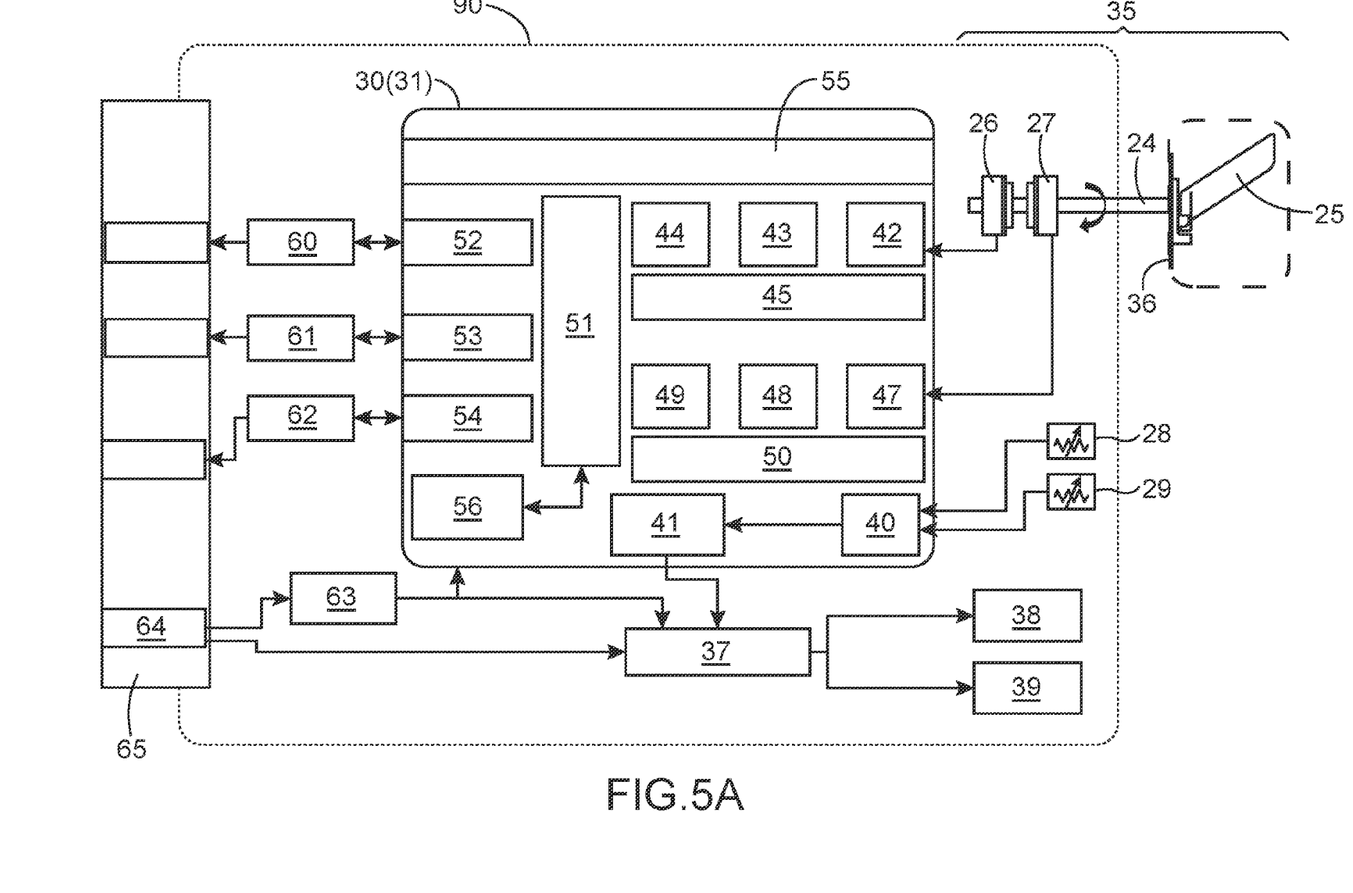
FIG. 5A illustrates the circuits of each of the processing boards of the probe according to the invention, FIG. 5B illustrating a variant embodiment.
Figure 5B:
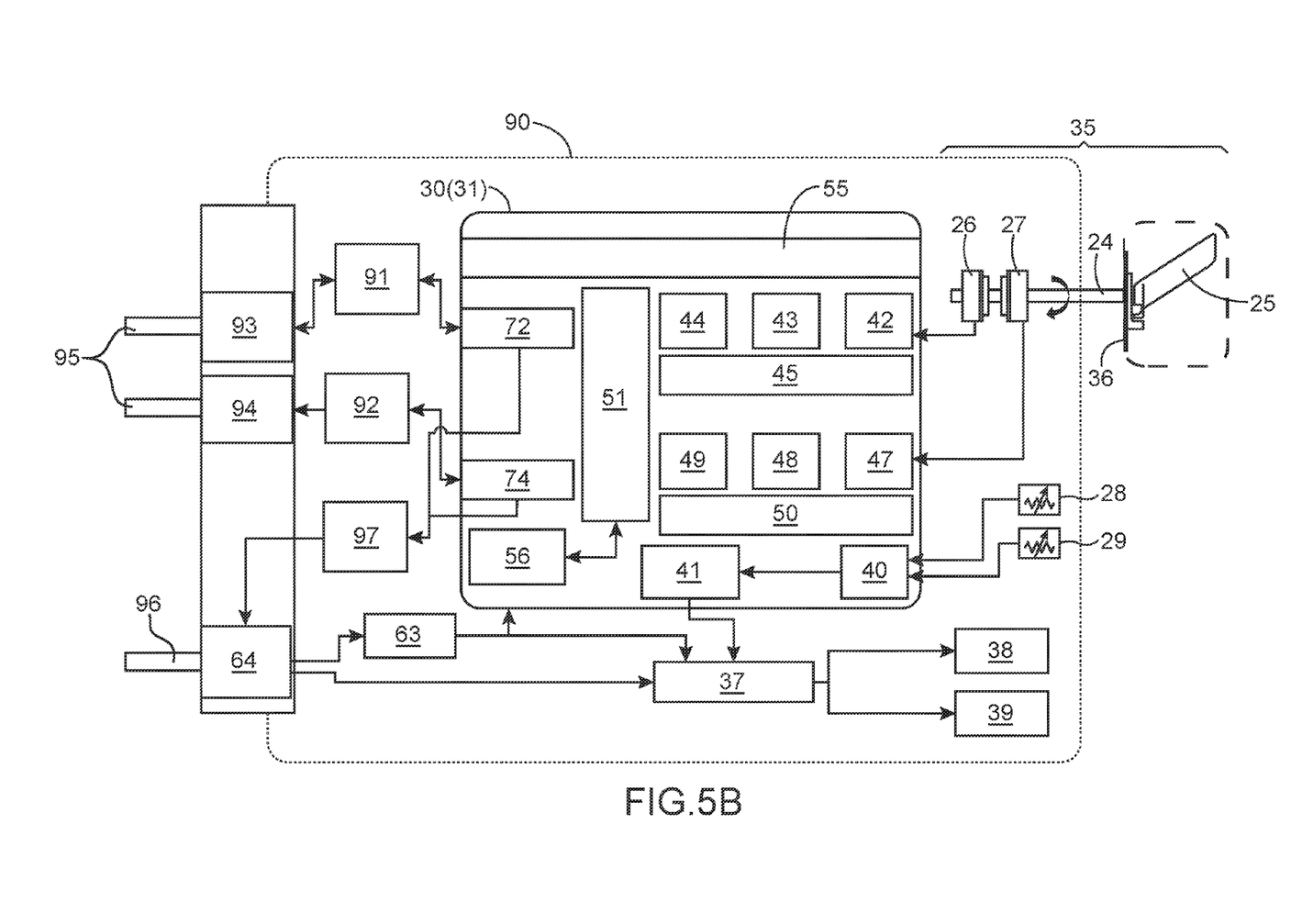

These various heating means and means for regulating these heating means are not represented in FIGS. 4A and 4B, but schematically represented in FIGS. 5A and 5B.

The housing 20 of the probe forms an EMI (Electromagnetic Interference) shield for all the elements that it contains, and in particular for the processing boards 30 and 31.

The probe 35 is designed to be fixed on the surface of an aeroplane, the top part of the cover 22 being flush with the skin 34 thereof.

When the aeroplane changes altitude (change of the value of the pitch angle or of the yaw angle), the fin 25 causes the axis 24 to rotate resulting in the rotation of the disks of the optical encoders 26 and 27. The data generated by each encoder are sent to the processing boards 30, 31 and processed by the means with which these boards are provided. Examples of processing of these data generated by each encoder are indicated later.

FIG. 5A is another representation of the probe, and more particularly of the different modules of a processing board 30, 31. Each of these boards is interconnected with one of the connectors 32 or 33 of FIG. 4B or 4C (but these connectors are not visible in FIG. 5A) and each optical encoder 26, 27 is connected to each processing board 30, 31 which therefore comprises processing means 42-44, 47-49 specific to each optical encoder. First processing means 42-44 receive and process the output signals from the first encoder, but not from the second encoder, while second processing means 47-49 receive and process the output signals from the second encoder, but not from the first encoder.

This FIG. 5A also schematically represents the two optical encoders 26 and 27 and the fin 25 of the probe. The shielding formed by the housing 20 protects the optical encoders and each processing board 30, 31.

In more detail, each processing board 30 or 31, which can be produced in the form of a programmable logic circuit (FPGA, or Field Programmable Gate Array), can comprise, for each optical encoder:
- an input/output interface 42, 47, via which the data from the encoders are input to the board;
- a logic processing unit 43, 48 for performing at least one processing operation according to a method as for example described below;
- a memory unit 44, 49 for storing, in particular, data which result from at least one processing operation as mentioned above;
- means 51, 45, 50 which implement synchronization functions for the internal buses, notably a clock function and a function for checking the contained tasks and processes (watchdog),
- buffer-forming means 56 for managing the data queues.

These different functions can be implemented in the form of a single programmable integrated circuit (of FPGA, Field Programmable Gate Array, type).

Interfaces 52, 53 and 54 allow, on the one hand, for the conditioning of the signals transmitted to drivers 60-62, and, on the other hand, for the protection of input ports of each processing board 30, 31 against overvoltages, short-circuits, overcurrents, etc.

From the thermal point of view, the probe comprises means 38, 39 for heating the fin 25 and its baseplate 36. A monitoring and control unit 37 can be dedicated to the control of the heating of these two elements 25, 36, preferably to ensure that they have a temperature T>0° C. This unit 37 can be produced, for example, by using power switching and control devices. As a variant, control of the heating means can be carried out by software. Temperature sensors 28, 29 can be provided, arranged as already indicated above.

In conjunction with this heating and de-icing aspect, it is also possible to use, as probe material, a material doped with hydrophobic nanoparticles (in order to prevent water from stagnating on its surface, and ice from forming).

Moreover, each processing board 30, 31 can comprise:
- an input/output interface 40 for the data from the temperature sensors 28 and 29,
- a circuit 41 for processing these data, which will generate signals for controlling the monitoring and control unit 37 of the heating means 38, 39.

For compatibility with electronic or computing means, arranged in the aeroplane, downstream of the probe, the driver 60, 61 and 62 make it possible to adapt the format of the data to be transmitted to these electronic or computing means; these data are notably angle measurement data, which have been generated by the processing boards 30, 31 as a function of the measurements performed using the optical encoders 26, 27. The format of these data is adapted to a format compatible with a transmission by one (or more) determined protocol(s), for example an AFDX, TTP, FiberChanel, ARINC 429 protocol and a CAN (Controller Area Network) bus protocol. Means 64 form an interface (for example in the form of a connector) for supplying voltage to the probe, again for example a DC voltage of +28 volts. As a variant, it is possible to implement the data transmission by PLC (Power Line Current) techniques in order to reduce the number of cables.

The probe of FIG. 5A also comprises a DC/DC power converter 63, which supplies the processing board 30, 31 proper, but also the monitoring and control unit 37 of the heating means 38, 39.

FIG. 5B is a variant embodiment of the probe, with an optical transmission of the data generated by the processing boards 30, 31. The elements already described in conjunction with FIG. 5A will not be described again here. Each processing board 30 and 31 here comprises two signal conditioning and impedance matching circuits 72, 74. These circuits allow, like the interfaces 52, 53 and 54 of FIG. 5A, on the one hand, for the conditioning of the signals to be transmitted to drivers 91, 92, and, on the other hand, for the protection of input ports of the processing board 30, 31 against overvoltages, short-circuits, overcurrents, etc. In practise, the output from the optical encoders is an electrical signal and short-circuits can occur on the drivers 91, 92 or short-circuits can be provoked by the probe power supply equipment.

Each of these circuits 72, 74 is therefore connected to the drivers 91, 92 which makes it possible to control optical transceivers and light-emitting diodes (LED). An optical contact 93, 94, preferably of expanded beam type, is arranged downstream of each of these means 91, 92.

Optical fibres 95, preferably of high robustness, then transmit the duly generated optical signal to electronic or computing means, arranged in the aeroplane, downstream of the probe.

The circuits 72, 74 also control a circuit 97, which in turn controls the interface 64 for supplying voltage to the probe, for example at a DC voltage of +28 volts, from a power line 96.

More particularly, the circuit 97 recovers the digital data, from the circuits 72, 74, and processes them according to an OFDM (Orthogonal Frequency Division Modulation) technique. This circuit 97 can be produced in the form of a plurality of electronic circuits, such as those used in the field of power line data transmission, by using an OFDM modulation. The circuit 97 can notably comprise the following means or circuits:
- means, or a circuit, of scrambler type, which make it possible to change the probability of long sequences of "0" and of "1" bits (for error correction);
- means, or a circuit, forming a cyclic encoder, in order to insert bits into the frames for the error detecting and correcting codes;
- means, or a circuit, forming an interleaver for protection against errors (burst errors) originating from the errored writing of bits in a queue;
- mapping means, or a mapping circuit, for mapping, for each subcarrier, the data bits with a view to modulation;
- a Fourier transform inverter, which makes it possible to decompose a series of values into components of different frequencies;
- an A/D converter, which makes it possible to convert the digital data into analogue signals;
- an output amplifier (for the line output).

All of these functions can be produced in the form of a module which can be integrated in the probe.

A line coupler can be added to the electrical wiring or connector.

To produce this circuit, it is possible, for example, to use the circuit MAX2990 from MAXIM.

The cable 96 is preferably a power coaxial cable. This type of cable offers the following advantages:
- it exhibits a high electromagnetic immunity;
- it provides good protection for data transmission;
- it is simple and quick to connect (all that is needed is a connector of bayonet type-like the BNC or TNC connectors);
- it makes it possible to place the optical fibres and the power cable in a single bundle (in a single loom);
- if a point of attachment is lost in a composite environment, no current is injected into the skin of the aeroplane, because the ground braid is on the outside.

Figure 6A:
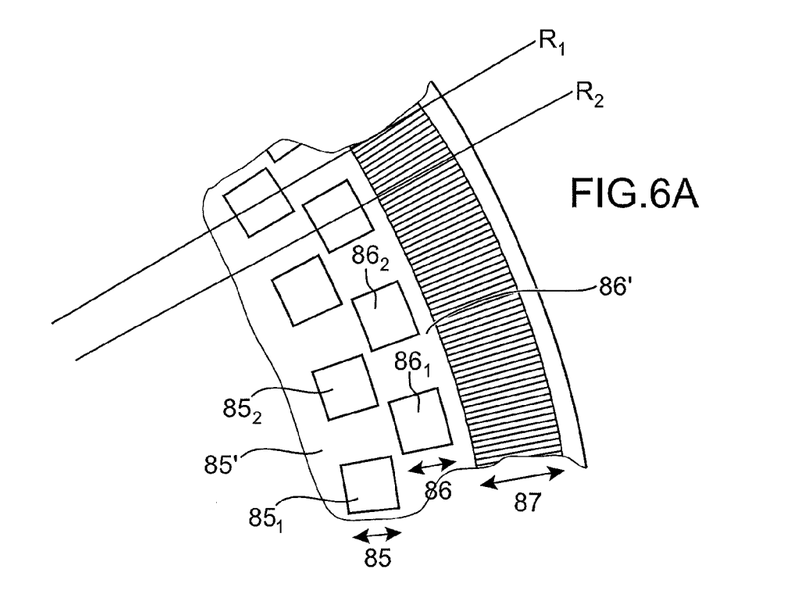
FIG. 6A illustrates a view of a part of a disk of an optical encoder of the probe according to the invention.
Figure 6B:
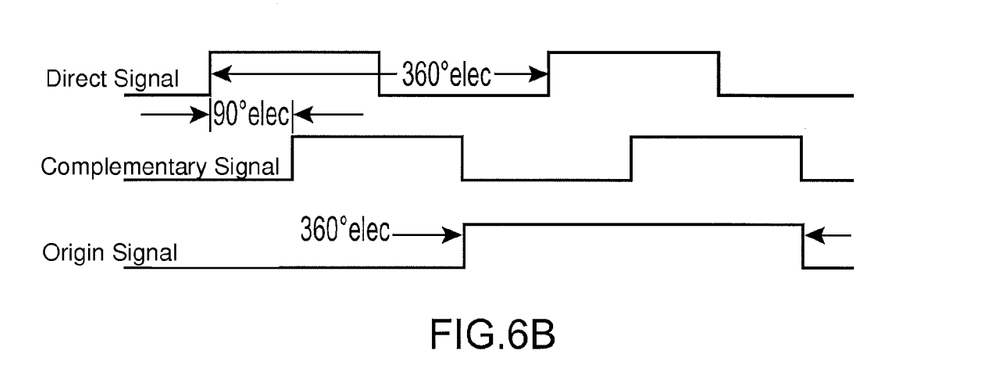
FIG. 6B represents signals from the two tracks of one and the same disk illustrating the direction of rotation of an optical encoder of the probe according to the invention.

FIGS. 6A and 6B respectively represent an optical disk and a timing diagram of the signals that can be generated by it.

Each disk comprises, preferably, two rows of slots offset in such a way that, on each rotation pitch, a slot and an absence of slot (the direct signal and the complementary signal) can be detected.

More specifically, an exemplary embodiment of a part of one of the optical disks 80, 81, 82 and 83 is illustrated in FIG. 6A. Each disk comprises:
- a measurement track 87, which comprises for example 2048; this track makes it possible to generate an origin signal;
- and two concentric complementary tracks 85 and 86; each of these complementary tracks comprises an alternation of slots (of dimensions greater than those of the lateral slots 87), two adjacent slots $85_1$, $85_2$ (respectively $86_1$, $86_2$) of one track being separated by an opaque zone 85' (respectively 86'). The slots, and the opaque zones which separate adjacent slots, of one of the two tracks are of dimensions substantially identical to those of the other track. The series of slots of one of the tracks is offset relative to the series of the slots of the other track; in a given radial direction R1 (respectively R2) of the disk, there is first of all a slot (respectively: an opaque zone between two slots) of the first track 85, the innermost of the disk, then an opaque zone between two slots (respectively: a slot) of the second track 86, situated between the first track and the measurement track 87.

This offsetting of the slots of the two tracks of one and the same disk makes it possible to identify the direction of rotation of the disk based on the order of arrival of the output electrical signals corresponding to these two tracks 85 and 86.

Each track of each disk is associated with a photo-electrical barrier. Each barrier comprises an LED and a photo-transistor (typically in the infrared range). The latter are arranged in such a way that, when a slot passes in front of the LED, the emitted light is picked up by the photo-transistor. Each barrier therefore detects the successions of slots, thus giving electrical signals in phase with the transitions of the slots. Each optical barrier is, for example, supplied at low voltage, DC (typically at a voltage of 12 V to 14 V) and supplies a signal in the form of a series of square waves.

The two barriers of one and the same disk are preferably offset by 180°.

For their part, the tracks of one and the same disk, of one and the same encoder, are slightly offset in order to generate an offset of 90° between the period of the signal from the first track (direct signal) and the period of the signal from the second track (complementary signal).

These offsets make it possible to reduce the interpolation errors in the processing of the signals, performed in the electronic boards already described above.

The electrical signals obtained by the two barriers of one and the same disk are called: direct signal and complementary signal (hereinafter denoted A and A\). The photo-electrical barrier generating the direct signal is called master photoelectric barrier hereinafter in the description.

If the encoder comprises a second disk, the electrical signals obtained by the two barriers of this second disk are also called direct signal and complementary signal, and are denoted B and B\.

Also in the case where the encoder comprises a second disk, the two disks are, once again preferably, offset by one slot. This makes it possible to:
- double the accuracy of the detection for a given number of slots;
- detect the direction of rotation both at the disk level and also at the decoder level;
- work in double-accuracy or single-accuracy mode (if one of the barriers fails).

As will be understood from the above explanations, each disk comprises a set of two photo-electrical barriers arranged so that the opening of one of these barriers corresponds to the closure of the other barrier (180° offset already mentioned above) of the disk.

Thus, if the disk of an encoder is rotated in one direction, the direct signal A, B is received before the complementary signal A\, B\, and if the direction of rotation of the disk is changed, the complementary signal A\, B\ is received before the direct signal A, B. The direction of rotation of the disk of the encoder is thus known.

In the case of a device comprising two encoders, each with two disks, the following notations can be chosen:

OE1 is used to designate one of the optical encoders, provided with two disks D1 and D2 (denoted OE1-D1 and OE1-D2).

The disk OE1-D1 of the encoder OE1 comprises two photo-electrical barriers (or two data channels), designated OE1-D1-A1 (generating a direct signal A1) and OE1-D1-A1\ (generating a complementary signal A1\). These photo-electrical barriers OE1-D1-A1 and OE1-D1-A1\ are offset, relative to one another, by 180°.

The disk OE1-D2 of OE1 comprises two photo-electrical barriers (or two data channels), designated OE1-D2-B1 (generating a direct signal B1) and OE1-D2-B1\ (generating a complementary signal B1\). These photo-electrical barriers OE1-D2-B1 and OE1-D2-B1\ are offset, relative to one another, by 180°.

OE2 is used to designate the other optical encoder, also provided with two disks D1 and D2 (denoted OE2-D1 and OE2-D2).

The disk OE2-D1 of OE2 comprises two photo-electrical barriers (or two data channels), designated OE2-D1-A2 (generating a direct signal A2) and OE2-D1-A2\ (generating a complementary signal A2\). These photo-electrical barriers OE2-D1-A2 and OE2-D1-A2\ are offset, relative to one another, by 180°.

The disk OE2-D2 of OE2 comprises two photo-electrical barriers (or two data channels), designated OE2-D2-B2 (generating a direct signal B2) and OE2-D2-B2\ (generating a complementary signal B2\). These photo-electrical barriers OE2-D2-B2 and OE2-D2-B2\ are offset, relative to one another, by 180°.

The photo-electrical barriers are arranged to make it possible to work in a number of modes:
- double-accuracy mode: the signals from both channels are available: there are, for example, 4096 slots per revolution, or
- single-accuracy mode: just one channel is available: there are, for example, 2048 slots per revolution,
- failure mode: if one of the two encoders 26 and 27 is no longer available (because one of the two encoders has failed), the other encoder can continue to operate by ensuring an accuracy level that is lower but sufficient to correctly process the data.

FIG. 6B illustrates the order of arrival of the signals from a disk, and, more particularly, an offset between the signal from the first track (direct signal) and the signal from the second track (complementary signal). The offset is 90° in the period.

As already explained above, each optical encoder 26 and 27 (or OE1 and OE2) has at least one disk, advantageously two disks (OE1-D1 and OE1-D2) provided with two tracks with transparent slots, each of the tracks associated with a photo-electrical barrier (A and B). Because of its structure, each disk of an optical encoder, for example OE1-D1, supplies the following signals:

a direct signal: OE1-D1-A1;
a complementary signal: OE1-D1-A1\;
an origin signal 0. This is, for example, generated as explained above, using a measurement track such as the track 87.

If a second disk is used in this same optical encoder OE1, it supplies the following signals:

a direct signal: OE1-D2-B1;
a complementary signal: OE1-D2-B1\;
an origin signal: 0.

Each of the processing means 42-44, 46-49 associated with each optical encoder receives the direct signals and the complementary signals from this optical encoder.

The corresponding processing means then work out the processing of these data, to determine the direction of rotation of the fin and the angle of this rotation:

a) if all the data computed by the different processing means 42-44, 47-49, associated with the different optical encoders, are identical, the data generated by one of these processing means are selected (this processing means is then called the "master");

b) if the data generated by one of the processing means are different from those generated by the other processing means, a check is performed over a number of measurement cycles for confirmation, and the data which are different from those obtained by all the other processing means are eliminated. If there are only two processing means, the value returned by each of the two systems is compared with the distribution of the stored values, and the one which has the greatest probability of being in the distribution is retained.

Since the disks and the encoders are mounted on the axis 24, they rotate in the same direction of rotation. The direction of rotation of the assembly is determined from the analysis of the signals from each disk which makes it possible to determine the direction of rotation of the disks, obtained by detecting which signal from which track is received first: direct or complementary. In relation to FIG. 6B, if the direct signal is measured before the complementary signal, the disk is rotating in one direction; if the complementary signal is received before the direct signal, the disk is rotating in the other direction. When there is no failure of the assembly, each of the direct signals from each of the disks is measured before each of the associated complementary signals, all the direct signals are measured before the associated complementary signals. A difference in the order of measurement of the signals from a disk in relation to the other disks indicates a failure of the assembly, for example a disk which has become detached from the axis 24. The measurement of the angle is obtained by counting the number of signal pulses (direct or complementary), because each pulse corresponds to a detection of the passage of a slot facing the opto-electronic barrier. If there are two encoders in the probe, there is twice the accuracy.

Each of the processing means 42-44, 47-49, associated with each optical encoder, stores the results of the last x estimations of the direction and of the angle of rotation (for example x=16, 32, 64 or 128).

These estimations are used in the electronic processing algorithms to:

perform the comparison between the data generated by the different processing means;
and/or check the consistency of the measurements (continuity in the measurements taken);
and/or eliminate anomalies;
optionally, retransmit frames lost in the transmission protocol;
and/or ensure a consistent transition from the double-accuracy measurement mode to the single-accuracy measurement mode.

The data determined by the processing means as explained above are then conditioned in a bus frame and transmitted to the onboard data processing computers.

A bus frame can comprise data such as:

identity of the probe,
identity of the current master photo-electrical barrier,
direct identity of the master optical encoder and complementary identity of the processing means which has performed the measurement,
results of the current estimation and of the last x measurements,
frame consistency verification code.

As will be understood from the explanations which have already been given above, the processing electronics can be redundant, if two processing boards 30, 31 are used. Thus, each optical encoder can send all the signals, outgoing in the form of pulses, to each of the processing boards, which can receive and process all the signals at a modest cost, because all the data are digital. All that is needed is to count the pulses of the signals and convert them into angles.

The software processing part of the probes incorporates a set of functions which make it possible to manage these probes according to their operating context.

It is thus possible to make use of a state machine (used in the programming algorithm) operating on the principle of a cellular automaton in order to increase the availability of the aeroplane, for example to:

enable operation of the probe when one of the two temperature sensors has failed,
enable operation if both temperature sensors have failed,
enable operation if an encoder channel has failed,
enable operation if one encoder has failed,
enable operation if two channels of two different encoders have failed, and so on.

The invention claimed is:

1. Angle measurement probe on board an aircraft, comprising:
a fin, which can move in rotation about an axis,
at least one first optical encoder and one second optical encoder, each comprising at least one disk, each disk being fixed at right angles to the central axis and being provided with at least two circular tracks, each track being provided with transparent slots alternating with opaque zones, each disk comprising at least two concentric tracks, each comprising successive slots, the slots of each track being offset relative to the slots of each other track;
a processor to process the output signal from each encoder.

2. The probe according to claim 1, also comprising a housing which contains said optical encoder(s) and the processor.

3. The probe according to claim 2, the housing and each encoder being seal-tight.

4. The probe according to claim 1, also comprising optical transmission means for transmitting angle measurement data generated by the processor.

5. The probe according to claim 1, also comprising:
at least one temperature sensor sensing the temperature of the fin,
means for heating the fin on the basis of data measured by said temperature sensor sensing the temperature of the fin.

6. The probe according to claim 1, also comprising damping means for each disk.

7. The probe according to claim 1, in which each optical encoder comprises two disks, each track of each disk being associated with an opto-electrical barrier which generates a signal, one of which is called direct signal and the other of which is called complementary signal.

8. The probe according to claim 7, in which the two disks of one and the same encoder are offset by 90°.

9. The probe according to claim 1, in which the two tracks of one and the same disk are offset in order to generate an offset of 90° between the period of the signal from one of the two tracks and the period of the signal from the other track.

10. The probe according to claim 1, in which said processor determines the direction of rotation of the fin and its angle of rotation as a function of at least two signals, each of these two signals being associated with a track of one of the disks.

11. The probe according to claim 10, in which:
a) if all the data computed for the different optical encoders are identical, the data generated for one of them are selected;
b) if the data generated for one of the encoders are different from those generated for the other encoder or encoders, a check is performed over several measurement cycles for confirmation, and the data which are different from those obtained for all the other encoders are eliminated.

12. The probe according to claim 10, comprising a first processor to receive and process output signals from the first encoder, but not from the second encoder, and a second processor to receive and process output signals from the second encoder, but not from the first encoder.

13. The probe according to claim 1, in which the processor is configured to store a plurality of results relating to the direction and the angle of rotation, for:
performing at least one comparison between the data;
and/or checking the consistency of the measured data;
and/or eliminating anomalies;
and/or retransmitting data lost in a transmission of said data;
and/or ensuring a transition between a double-accuracy measurement mode and a single-accuracy measurement mode.

14. The probe according to claim 1, in which the two barriers of one and the same disk are offset by 180°.

15. An aircraft comprising at least one probe according to claim 1, arranged on the skin thereof.

* * * * *